Patented Dec. 5, 1950

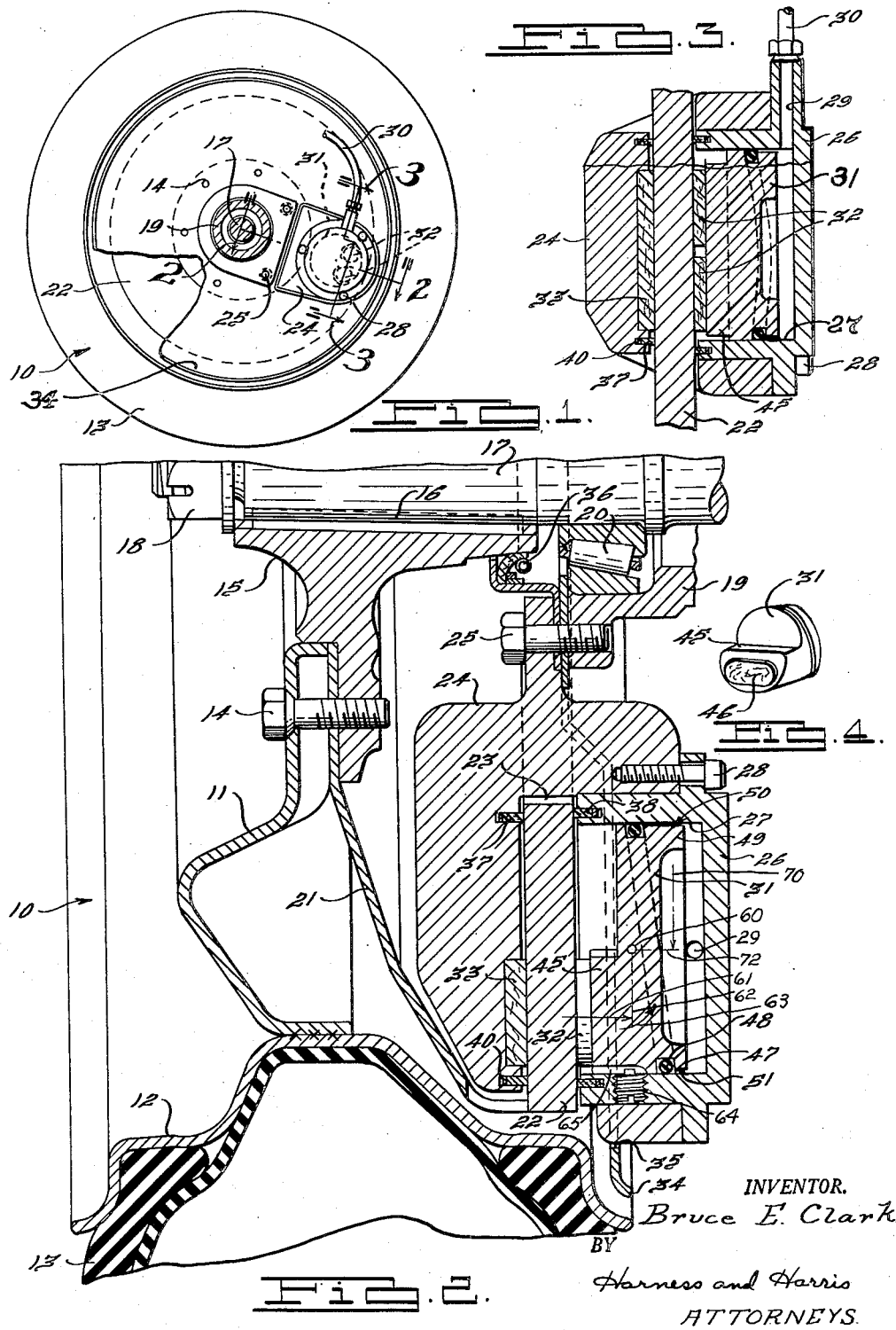

2,533,093

UNITED STATES PATENT OFFICE 2,533,093

FLUID PRESSURE OPERATED DISK BRAKE WITH COMPENSATING PISTON

Bruce E. Clark, Detroit, Mich., assignor to Chrysler Corporation, Highland Park, Mich., a corporation of Delaware Application August 29, 1946, Serial No. 693,639

6 Claims. (Cl. 188—152)

This invention relates to vehicle brakes and more particularly to a disc brake having a piston carrying friction pads offset from the center line of said piston and means to compensate for the moment produced on said piston by engagement of said offset pads with said disc.

Limited contact disc brakes are known and commonly provide a disc portion operatively secured to the vehicle wheel or rotatable axle in substantially parallel relationship with the wheel in combination with a non-rotatable portion. The non-rotatable portion is provided with means to force a friction element carried by the non-rotatable portion to contact the side of the disc under pressure. Usually the member referred to presents a small braking surface relative to the disc area and when the wheel and disc rotate and the brake is applied, the friction element is forced into contact with the disc. The disc braking surface rotates past the friction element with only a minor portion in engagement therewith at any one time while the major portion is exposed to the air and being cooled.

My copending application Serial Number 693,640, filed August 29, 1946, discloses means by which the effective radius of the braking moment may be increased by moving the friction surface close to the periphery of the disc. This is accomplished by distributing the friction pad material so that its dimensions in the direction of the disc radius are minimized and the dimensions normal to the disc radius are at their maximum. This construction locates the resultant of the frictional force resisting rotation of the disc as far as possible from the axis of disc rotation. The braking moment is thereby increased since it is the product of the frictional force times the effective lever arm to which the force is applied. The constructions therein illustrated all provided friction pads symmetrically disposed on a piston.

It is considerably easier and more economical to manufacture a cylindrical piston than a piston having an elliptical cross section as illustrated in the copending application. However, in order to maintain a long effective lever arm from the disc axis to the friction pads it is necessary to locate the pads in the outer portion of the piston face. The friction pads being thus offset from the axis of the cylindrical piston apply a moment to the piston when in engagement with the disc. This moment tends to disalign the piston in its cylinder. I have provided means to compensate for this moment so that free axial movement of the piston in its cylinder is maintained and the advantages of economical manufacture and a long lever arm are maintained.

In the drawings:

Fig. 1 is an elevation of a vehicle wheel viewing its internal surface and showing the disc brake associated therewith;

Fig. 2 is a section taken on the line 2—2 of Fig. 1;

Fig. 3 is a section taken on the line 3—3 of Fig. 1; and

Fig. 4 is a perspective view of a modified piston and friction pad construction in which one pad is used instead of two pads.

The vehicle wheel 10 comprises a disc portion 11, a rim 12, and tire 13. The wheel is secured by screws 14 to the hub 15 in the usual manner. The tapered hub 15 is keyed at 16 to the usual tapered axle 17 and secured thereto against linear movement relative to the axis of the axle by the nut 18. The axle housing 19 rotatably supports axle 17 by bearings 20. The brake is illustrated and described with reference to an automobile driving wheel although it is to be understood that it could be used with other vehicles and with driven wheels.

The brake to be described is composed of two portions. One of these portions is secured to and rotates with the wheel 10. This portion comprises a dished supporting member 21 which is secured to the hub 15 by screws 14 and carries at its outer extremity a disc 22. The disc 22 has a central opening 23 which gives it a ring shape. The disc 22 is disposed substantially normal to the axle 17 and rotates therewith through the key 16, hub 15, screws 14, and supporting member 21. The second portion of the disc brake is the stationary portion which is mounted upon the axle housing 19 and comprises a brake housing 24 which is secured to the axle housing by the screws 25. The brake housing 24 because it is secured to the axle housing 19, is stationary. It is provided with a substantially U-shaped cross section which straddles the rotatable disc 22 and has portions disposed adjacent both the outer and the inner surfaces of the disc 22. The brake housing 24 supports a hydraulic braking means adapted to contact the disc 22 and resist rotation of the latter by friction. This means comprises a member 26 which has a cylinder 27 formed therein on an axis parallel to the axle 17. The cylindrical member 26 is secured to the brake housing 24 by screws 28. The cylinder 27 is connected to a suitable source of supply of fluid by passage 29 in member 26 and conduit 30.

Braking fluid may be supplied to the cylinder 27 under pressure in the usual manner employed by hydraulic braking systems. A piston 31 is slidably mounted in cylinder 27 for axial movement in the cylinder 27 when fluid is supplied under pressure to one side of the piston. A pivot point screw 64 is threaded in member 26 and cooperates with a keyway 65 in piston 31 to prevent the latter from rotating on the axis of the cylinder. Two pads 32 of fibrous friction material are bonded to one face of the piston 31 and are positioned in close proximity to the rotatable disc 22. A pad 33 of fibrous friction material is bonded to brake housing 24 adjacent the disc 22 immediately opposite the pads 32. It will thus be seen that the entrance of fluid through conduit 30 will exert force on piston 31 moving it to the left as viewed in Fig. 2 thereby squeezing the ring 22 between the pads of friction material 32 and 33. The rotation of the disc 22 is resisted by the friction of these pads on its surface and the force resisting this rotation reacts through pads 32, the brake housing 24 to the stationary axle housing 19.

A dust shield 34 is illustrated as secured to the axle housing 19 by the screws 25 and extends substantially parallel to the wheel 10. The dust shield is circular in form and has an opening 35 provided therein through which the brake housing 24 extends. The dust shield may be used to prevent the entrance of some road dust into the area between the shield and the wheel. The dust shield may be omitted if a better circulation of cooling air around the disc 22 is desired.

Oil for the axle housing 20 is sealed in the area adjacent the bearing 30 by the usual oil seal 36.

A means to assure the presence of a clean disc surface between the friction pads 32 and 33 is described and claimed in my copending application, Serial No. 693,641, filed August 29, 1946, Patent No. 2,496,699, February 7, 1950. A circular channel 37 is provided in the brake housing 24. The channel 37 surrounds the pad 33. A similar channel 38 is provided in the member 26 surrounding the pad 32. A circular non-metallic absorbent wiper such as commercial plumbers' asbestos rope packing is provided in each of the channels 37 and 38. A spring washer 40 is provided in the base of each channel so that the absorbent wiper is resiliently urged into constant contact with the rotatable disc 22. It will then be seen that no surface portion of the disc 22 can contact the friction pads 32 or 33 unless it has first been subjected to the cleansing action of the wipers.

In the Figs. 1, 2, and 3 form of the invention the cylindrical piston 31 is provided with an extended semi-cylindrical head portion 45 to which the friction pads 32 are bonded. The pads are located as far as possible from the axle 17. When the piston is moved and the pads 32 engage the disc 22 under pressure, the pressure reacts through the pads creating a moment tending to cock the piston by rotating it about the axis 60 in Fig. 2. The lever arm 62 of the moment is equal to the distance of the center of the combined area of the pads from the axis of the piston. The center of area has been referred to because it is substantially the point of application of the resultant of the forces which is illustrated in Fig. 2 by the arrow 61. Thus in Fig. 2 the tendency is for piston 31 to attempt to rotate in a counterclockwise direction in cylinder 27 as indicated by the arrow 63.

The operation of the Fig. 4 form of the invention is substantially identical to that of the Figs. 1 through 3 forms and therefore will not be described separately. The Fig. 4 form is provided with one friction pad 46 instead of the two pads 32, illustrated in Figs. 1 through 3.

Means are provided to impart an oppositely directed moment to piston 31 to offset the counterclockwise moment referred to above. The piston 31 is provided with a channel 47 adapted to receive a sealing ring 48 which seals the brake fluid behind the piston 31 in cylinder 27. The portion 49 of the piston 31 that is disposed behind the sealing ring (to the right in Fig. 2) has a reduced diameter so that the brake fluid may easily penetrate the sides of the piston as far forward as the sealing ring 48. The channel 47 and sealing ring 48 are not located in a plane normal to the piston axis as in the constructions usually employed. They are located in a plane that is inclined relative to the disc 22 and have the portions thereof nearest to the axle 17 located closer to the disc 22 than the portions disposed near the outer periphery of the disc 22.

The entrance of fluid under pressure through conduit 30, and passage 29 into cylinder 27 applies pressures on the piston 31. The pressure in the fluid is the same in all directions. The pressure applies one force parallel to the axis of the piston and additional forces normal to the axis acting upon the curved side walls of the piston extension 49 as, for example, at the points designated 50 and 51 in Fig. 2. Since the force per unit area or pressure is the same at points 50 and 51 and since the exposed piston area is greater at 50 than at 51 the force acting on the piston at 50 is greater than the force at 51. The resultant of all forces applied by the fluid to the side walls of the piston extended portion 49 is a force at 50 directed normal to the piston axis. The direction of application of this force has been illustrated in Fig. 2 by the arrow 70. This force produces a moment tending to rotate piston 31 in a clockwise direction about an axis 60. This moment counteracts the counterclockwise moment discussed above with reference to the pressure of the friction pad on the disc 22. The magnitude of the clockwise moment is governed by the slope of the sealing ring 48 and the length of the piston. The length controls the lever arm 72 upon which the force 70 acts. Thus with all moments neutralized the piston 31 is adapted to move axially without cocking or binding unevenly on the walls of cylinder 27.

I claim:

1. In a brake housing having a cylinder therein, a piston slidably mounted in said cylinder, hydraulic means to move said piston, said piston having a first portion adapted to slidably engage the walls of said cylinder and a second portion having a smaller diameter than said first portion, said second portion having an irregular length whereby forces applied laterally of said second portion by said hydraulic means provide a resultant force directed laterally of the piston axis.

2. In a brake, the combination of an element rotatable about an axis and a non-rotatable element, a disc member carried by one of said elements in a plane normal to said axis, a piston slidably mounted in the other of said elements, a friction element carried by one end of said piston, the center of the surface area of said friction element being offset from the axis of said piston, means to apply hydraulic pressure to the other end of said piston to move said piston and engage said friction element with portions of said disc to brake said rotatable element, said piston having a reduced peripheral portion adjacent said other end and exposed to said hydraulic pressure, said peripheral portion having the greater portion of its area concentrated adjacent one side of said piston whereby said pressure applies a moment to said piston to neutralize the moment applied to said piston by the engagement of said offset friction element with said disc.

3. In a vehicle, the combination with an element rotatable about a first axis and a non-rotatable element, of a disc carried by said rotatable element and having its axis coinciding with said first axis, a housing carried by said non-rotatable element, a piston slidably mounted in said housing, a friction pad carried by one end of said piston parallel to said disc, means to apply hydraulic pressure to the other end of said piston to move said piston and to contact an area of said disc with said pad to brake said disc and said rotatable element, the center of said area and the axis of said piston being disaligned, said housing and said piston cooperating to define a passage for the hydraulic medium to contact a portion of one side of said piston to thereby apply a moment to said piston to counteract the moment applied to the piston by said engagement and said disaligned pad with said disc.

4. In a disc brake a rotatable disc, a housing having a cylinder therein, a piston slidably mounted in said cylinder for movement on an axis normal to said disc, said piston having a friction pad secured to one end face thereof, said pad being substantially located within the confines of said cylinder and offset axially of said piston so that the center of said pad is located radially in closer proximity to the periphery of said disc than is the axis of said piston and means adapted to impart movement to said piston.

5. In a disc brake a rotatable disc, a housing having a cylinder therein, a piston slidably mounted in said cylinder for movement on an axis normal to said disc, said piston having a circular cross section and a friction pad eccentrically located on one face thereof and being entirely within the periphery of said circular cross section, said pad having its center of area located radially in closer proximity to the periphery of said disc than is the axis of said piston.

6. In a disc brake a rotatable disc, a housing having a cylinder therein, a piston slidably mounted in said cylinder for movement on an axis normal to said disc, said piston having a circular cross section and a friction pad eccentrically located on one face thereof, said pad having its center of area located radially in closer proximity to the periphery of said disc than is the axis of said piston, a sealing ring surrounding said piston and sealing said piston in said cylinder and means to apply hydraulic pressure behind said piston, said sealing ring being located in a plane inclined to the axis of said piston so that hydraulic force is applied in unequal amounts to lateral surfaces of said piston to neutralize the moment imparted to said piston by engagement of said pad with said disc.

BRUCE E. CLARK.

REFERENCES CITED

The following references are of record in the file of this patent:

UNITED STATES PATENTS

| Number | Name | Date |
| --- | --- | --- |
| 2,219,792 | Rasmussen | Oct. 29, 1940 |
| 2,405,219 | Lambert | Aug. 6, 1946 |